(12) United States Patent
Kirisken

(10) Patent No.: US 10,775,893 B2
(45) Date of Patent: Sep. 15, 2020

(54) SYSTEM AND METHOD FOR SIMULATING A REACTION FORCE FROM A VIRTUAL OBJECT

(71) Applicant: VESTEL ELEKTRONIK SANAYI VE TICARET A.S., Manisa (TR)

(72) Inventor: Barbaros Kirisken, Manisa (TR)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 0 days.

(21) Appl. No.: 16/091,836

(22) PCT Filed: May 4, 2017

(86) PCT No.: PCT/EP2017/060615
§ 371 (c)(1),
(2) Date: Oct. 5, 2018

(87) PCT Pub. No.: WO2017/191237
PCT Pub. Date: Nov. 9, 2017

(65) Prior Publication Data
US 2019/0129502 A1    May 2, 2019

(30) Foreign Application Priority Data
May 4, 2016 (EP) ..................................... 16168363

(51) Int. Cl.
*G06F 3/045* (2006.01)
*G06F 3/01* (2006.01)
(Continued)

(52) U.S. Cl.
CPC ............ *G06F 3/016* (2013.01); *G06F 3/0346* (2013.01); *G06F 3/0414* (2013.01);
(Continued)

(58) Field of Classification Search
CPC .......... G06F 3/01; G06F 3/016; G06F 3/0346; G06F 3/03547; G06F 3/041;
(Continued)

(56) References Cited

U.S. PATENT DOCUMENTS 8,294,557 B1 * 10/2012 El Saddik ............... G06F 3/016
340/407.1
9,370,704 B2 * 6/2016 Marty ................ G09B 19/0038
(Continued)

FOREIGN PATENT DOCUMENTS

EP      3343318 A1 * 7/2018 ........... G06F 1/1684
JP      2011528831      11/2011
(Continued)

OTHER PUBLICATIONS

The International Search Report (ISR) with Written Opinion for PCT/EP2017/060615 dated May 19, 2017, pp. 1-16.
(Continued)

*Primary Examiner* — Joe H Cheng
(74) *Attorney, Agent, or Firm* — McDonnell Boehnen Hulbert & Berghoff LLP

(57) ABSTRACT

The present invention provides a system for simulating a reaction force from a virtual object. The system at least comprises an input force sensor, calculating means connected to the input force sensor, at least a first pair (201*a*, 201*b*) of linear resonant actuators (LRAs) and a driver for the LRAs connected to the calculating means. The input force sensor is to sense an input force applied to the virtual object by a user. The calculating means is to receive the input force from the input force sensor and to calculate the reaction force to apply to the user. The pair of LRAs (201*a*, 201*b*) are constrained to move along a first axis (Y). The driver is to receive from the calculating means drive signals to alternately drive each one of the pair of LRAs (201*a*,
(Continued)

201b) in a first direction along the first axis by an amount determined by the reaction force, whilst allowing the other one of the pair of LRAs to recover more gently in a direction opposite to the first direction. The invention also provides a corresponding method of simulating a reaction force from a virtual object and a mobile device (101) at least comprising such a system.

13 Claims, 7 Drawing Sheets

(51) Int. Cl.
  *G06F 3/041* (2006.01)
  *G06F 3/0346* (2013.01)
  *G06F 3/0484* (2013.01)
  *G06F 3/0488* (2013.01)
(52) U.S. Cl.
  CPC ........ *G06F 3/0416* (2013.01); *G06F 3/04842* (2013.01); *G06F 3/04886* (2013.01); *G06F 2203/014* (2013.01)
(58) Field of Classification Search
  CPC .. G06F 3/0414; G06F 3/0416; G06F 3/04842; G06F 2203/014
  See application file for complete search history.

(56) References Cited

U.S. PATENT DOCUMENTS

| | | | |
|---|---|---|---|
| 2008/0252594 A1* | 10/2008 | Gregorio | ............... B06B 1/0238 345/156 |
| 2012/0029957 A1 | 2/2012 | Chien et al. | |
| 2012/0232780 A1* | 9/2012 | Delson | ................... A63F 13/06 701/400 |
| 2014/0184497 A1* | 7/2014 | Birnbaum | ............... G06F 3/016 345/156 |

FOREIGN PATENT DOCUMENTS

| | | |
|---|---|---|
| JP | 2015007998 | 1/2015 |
| KR | 10-2011-0072211 | 6/2011 |
| WO | 2015/023670 A1 | 2/2015 |

OTHER PUBLICATIONS

Second Written Opinion of the International Preliminary Examining Authority for PCT/EP2017/060615 dated Mar. 26, 2018, pp. 1-8.
The International Preliminary Report on Patentability for PCT/EP2017/060615 dated Sep. 20, 2018, pp. 1-26.

* cited by examiner

SYSTEM AND METHOD FOR SIMULATING A REACTION FORCE FROM A VIRTUAL OBJECT

CROSS-REFERENCE TO RELATED APPLICATION

This application is a U.S. national phase of International Application No. PCT/EP2017/060615, filed May 4, 2017, which claims priority to European Patent Application No. 16168363.6, filed May 4, 2016, both of which are incorporated by reference herein in their entirety.

The present invention relates to a system for simulating a reaction force from a virtual object according to claim 1, a mobile device according to claim 9 and a method according to claim 10.

BACKGROUND OF THE INVENTION

Systems and methods for simulating a reaction force from a virtual object are known to provide haptic feedback to a user in response to an input force applied to the virtual object by the user. An example of a system for providing such haptic feedback is described in WO 2005/043365 A. However, if the device on which the virtual object is displayed has its own weight which is felt by the user and/or is a portable or mobile device, there is no currently satisfactory way to simulate a reaction force from a virtual object displayed on such a device. For example, WO 2009/138814 only describes providing haptic feedback to a user in order to identify functions or the results of motion of the device itself, and in particular of a mobile device, rather than from a virtual object which is displayed on the device.

OBJECT OF THE INVENTION

It is therefore an object of the invention to provide a system for simulating a reaction force from a virtual object, a mobile device comprising such a system and a method of simulating a reaction force from a virtual object.

DESCRIPTION OF THE INVENTION

The object of the invention is solved by a system according to claim 1. Preferably, the system at least comprises an input force sensor, calculating means connected to the input force sensor, at least a first pair of linear resonant actuators (LRAs) and a driver for the LRAs connected to the calculating means. The input force sensor is to sense an input force applied to the virtual object by a user. The calculating means is to receive the input force from the input force sensor and to calculate the reaction force to apply to the user. The pair of LRAs are constrained to move along a first axis. The driver is to receive from the calculating means drive signals to alternately drive each one of the pair of LRAs in a first direction along the first axis by an amount determined by the reaction force, whilst allowing the other one of the pair of LRAs to recover more gently in a direction opposite to the first direction.

This solution is beneficial since it can be used to simulate a reaction force from a virtual object displayed on a device which has its own weight felt by a user and/or is a portable or mobile device. The device may, for example, be a mobile device, such as a tablet computer, which typically weighs less than about 800 g or a mobile phone, which typically weighs less than about 200 g. The reaction force is simulated by driving at least a pair of linear resonant actuators (LRAs) to perform strokes in antiphase with each other in the manner just described. LRAs, which are also known as linear resonance actuators or linear resonating actuators, contain massive bodies (m) which can be rapidly accelerated (a) to generate a force (F) according to Newton's second law of motion, F=ma. Since forces are vectors, the calculating means in the system of the invention calculates both a magnitude and a direction of the reaction force to apply to the user.

A particular feature of the invention is that by using a pair of LRAs constrained to move along a first axis, one of the pair of LRAs can be rapidly accelerated by the driver to perform a stroke in a first direction along the first axis, thereby generating a first force, whilst the other one of the pair of LRAs is allowed to recover more gently in a direction opposite to the first direction, thereby generating a lesser opposing force due to the more gentle recovery. The net force resulting from the first force minus the lesser opposing force can thus be used to simulate a component of the reaction force from the virtual object acting in the direction of the first axis. In other words, the first force and the lesser opposing force generated by the pair of LRAs moving in antiphase with each other do not cancel each other out. The system can thereby simulate the reaction force from the virtual object even if a device in which the system is located has its own weight and/or is portable or mobile, with the net force to be generated by the pair of LRAs being determined by the reaction force calculated by the calculating means. By changing the speeds of movement of the massive bodies in the LRAs, also called stroke and recovery, artificial mass/weight effects of the virtual object can be simulated. Nevertheless, although the system is particularly suitable for use in a lightweight and/or mobile device, it may also be used in larger, heavier and/or static/fixed devices.

Typically, the reaction force simulated by the LRAs is transmitted to the user by inducing an overall motion of the device in which the system is located, which is felt by the user. However, the reaction force may instead be transmitted to the user by other means, such as through the input force sensor. This latter approach may be more appropriate in the case of heavier and/or fixed devices.

Advantageous embodiments of the invention may be configured according to any claim and/or part of the following description.

Preferably, the input force sensor of the system comprises a touch-sensitive screen for displaying the virtual object. Thus the user may manipulate the virtual object on the touch-sensitive screen, and the system may provide haptic feedback to the user as the user manipulates the object on the screen. The touch-sensitive screen may detect the input force from the user through a capacitive effect of the user's touch on the screen, for example.

According to a preferred embodiment of the invention, the system further comprises a gravity detector connected to the calculating means. The gravity detector is to detect a local direction of gravity and to supply the local direction of gravity to the calculating means, which the calculating means can then use to calculate a weight of the virtual object. Since weight is a force, the calculating means can calculate both the magnitude and direction of the weight according to a mass of the virtual object and the local direction of gravity detected by the gravity detector. The weight of the virtual object can then form at least a part of the reaction force. For example, if the user attempts to lift the virtual object against the local force of gravity, the calculating means will calculate the reaction force to apply to the user to include the weight of the object.

The gravity detector may for example comprise at least a gyroscopic compass and an accelerometer, preferably a set of such gyroscopic compasses and accelerometers appropriate to determine the orientation and/or motion of a device in which the system is located in three dimensions, and thereby an orientation of the virtual object with respect to the local direction of gravity. The calculating means may thus determine a direction in which the reaction force should be applied to the user to simulate the weight of the virtual object.

The reaction force may include, without limitation, any one or more of the following: inertia of the virtual object due to its virtual mass, a frictional force acting on the virtual object, a reaction force due to interaction of the virtual object with another virtual object in the same virtual environment, such as is displayed on the same touch screen, a buoyancy and/or drag force due to immersion of the virtual object in a fluid medium in the same virtual environment, and a force due to elastic resilience or one or more other mechanical properties of the virtual object. Preferably, however, the reaction force is due to or comprises the weight of the virtual object.

Preferably, the system further comprises at least a second pair of LRAs constrained to move along a second axis crossing the first axis. Thus with at least two different pairs of LRAs respectively aligned along two non-parallel axes in this manner, a reaction force acting in any direction in an entire plane may be simulated by providing the first and second pairs of LRAs with drive signals to simulate appropriate components of the reaction force calculated by the calculating means. This makes the system more versatile than one having LRAs constrained to move along only one axis, for example along an axis parallel to a direction in which a device containing the system is expected to be oriented most often with respect to gravity for preferential simulation of the weight of a virtual object.

More preferably still, the system further comprises at least a third pair of LRAs constrained to move along a third axis lying outside a plane defined by the first and second axes. This allows the system to simulate a reaction force acting in any direction in three dimensions, by providing the first, second and third pairs of LRAs with drive signals to simulate appropriate components of the reaction force calculated by the calculating means. Preferably, the first, second and third axes are orthogonal to each other for ease of construction and operation, and for simpler calculation of the appropriate components of the reaction force by the calculating means.

The system may comprise more than two LRAs per axis. This is advantageous for increasing the sensation of the reaction force by the user and the haptic effect.

The LRAs have a resonant frequency which is preferably above 80 Hz, more preferably above 90 Hz and most preferably above 100 Hz. Whereas the LRAs do not have to be driven at or near to their resonant frequency, this means that each pair of LRAs can be driven most efficiently at or near to their resonant frequency in antiphase with each other at a combined frequency which is preferably more than 160 Hz, more preferably above 180 Hz and most preferably above 200 Hz. At such frequencies, individual movements of the LRAs are too rapid for a user to be able to discriminate them from each other, and the user instead experiences a single continuous reaction force.

The present invention also relates to a mobile device at least comprising a system according to any one of claims 1 to 8. Thus the input force sensor may comprise a touch screen of the mobile device and the calculating means may comprise a central and/or auxiliary processing unit of the mobile device. The mobile device may be a tablet computer or a mobile phone, for example.

The present invention further relates to a method of simulating a reaction force from a virtual object. The method preferably at least comprises the steps of: sensing an input force applied to the virtual object by a user, calculating the reaction force to apply to the user, and applying the reaction force to the user using at least a first pair of linear resonant actuators (LRAs). The reaction force is applied to the user by constraining the pair of LRAs to move along a first axis and alternately driving each one of the pair of LRAs in a first direction along the first axis by an amount determined by the reaction force, whilst allowing the other one of the pair of LRAs to recover more gently in a direction opposite to the first direction.

Preferably, the virtual object is displayed on a touch-sensitive screen and the input force applied to the virtual object by the user is sensed by the touch-sensitive screen.

In a preferred embodiment, the method further comprises detecting a local direction of gravity and calculating a weight of the virtual object as at least a part of the reaction force.

Preferably, the reaction force is applied to the user using at least a second pair of LRAs by constraining the second pair of LRAs to move along a second axis which intersects the first axis, and alternately driving each one of the second pair of LRAs in a second direction along the second axis by an amount determined by the reaction force, whilst allowing the other one of the second pair of LRAs to recover more gently in a direction opposite to the second direction.

More preferably still, the reaction force is applied to the user using at least a third pair of LRAs by constraining the third pair of LRAs to move along a third axis lying outside a plane defined by the first and second axes, and alternately driving each one of the third pair of LRAs in a third direction along the third axis by an amount determined by the reaction force, whilst allowing the other one of the third pair of LRAs to recover more gently in a direction opposite to the third direction.

Each one of the pair of LRAs is alternately driven at a frequency which is preferably above 80 Hz, more preferably above 90 Hz and most preferably above 100 Hz. This means that the pair of LRAs can be driven at a combined frequency which is preferably more than 160 Hz, more preferably above 180 Hz and most preferably above 200 Hz. This has the advantage that individual movements of the LRAs are too rapid for a user to be able to discriminate them, and the user instead experiences a single continuous reaction force.

The present invention further relates to a computer program product or a program code or system for executing one or more than one of the herein described methods.

Further features, goals and advantages of the present invention will now be described in association with the accompanying drawings, in which exemplary components of the invention are illustrated. Components of the systems, devices and methods according to the invention which are at least essentially equivalent to each other with respect to their function can be marked by the same reference numerals, wherein such components do not have to be marked or described in all of the drawings.

In the following description, the invention is described by way of example only with respect to the accompanying drawings.

DETAILED DESCRIPTION

Figure 1:
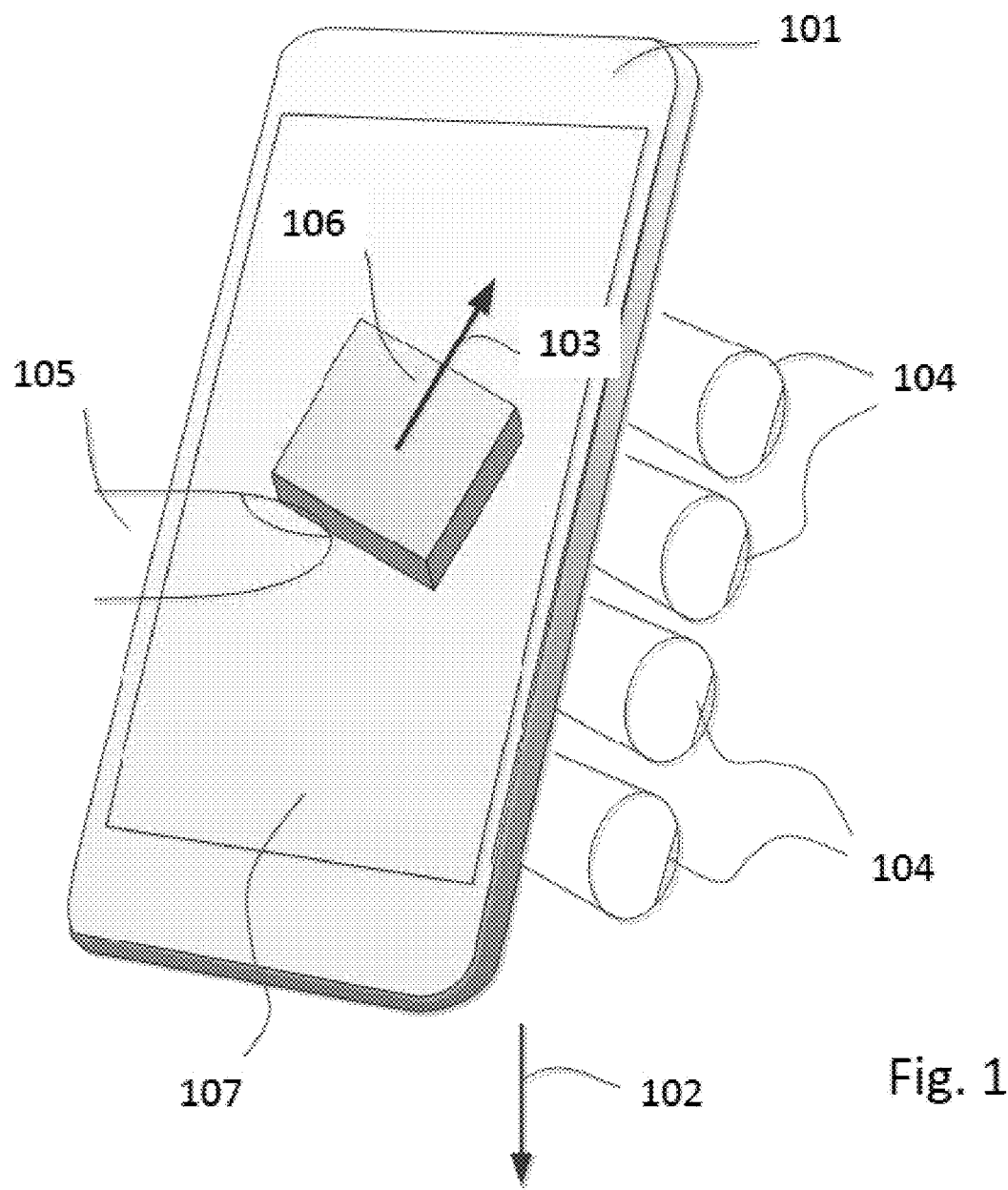
FIG. 1 is a schematic perspective view of an embodiment of a mobile device held by a user.

FIG. 1 schematically shows an embodiment of a mobile device 101 held in the hand of a user, wherein reference numerals 104 indicate fingers on the hand of the user and reference numeral 105 indicates the thumb on the hand of the user. Arrow 102 represents the direction of the force of gravity and therefore the orientation of the mobile device 101 with respect to the local force of gravity. The mobile device 101 has a touch screen 107 on which a virtual object 106 is displayed. For example, the user is attempting to push the object 106 with his thumb 105 in a direction indicated in FIG. 1 by arrow 103. The touch screen 107 senses an input force from the user's thumb 105 by the capacitive effect of thumb 105. The virtual object 106 has a virtual mass. The mobile device contains an exemplary embodiment of a system according to the invention. Since the user is attempting to lift the object 106 by the motion of his thumb 105, the system produces a reaction force representing the weight of the object 106, which the user experiences by an overall movement of the mobile device 101 in his hand.

Figure 2:
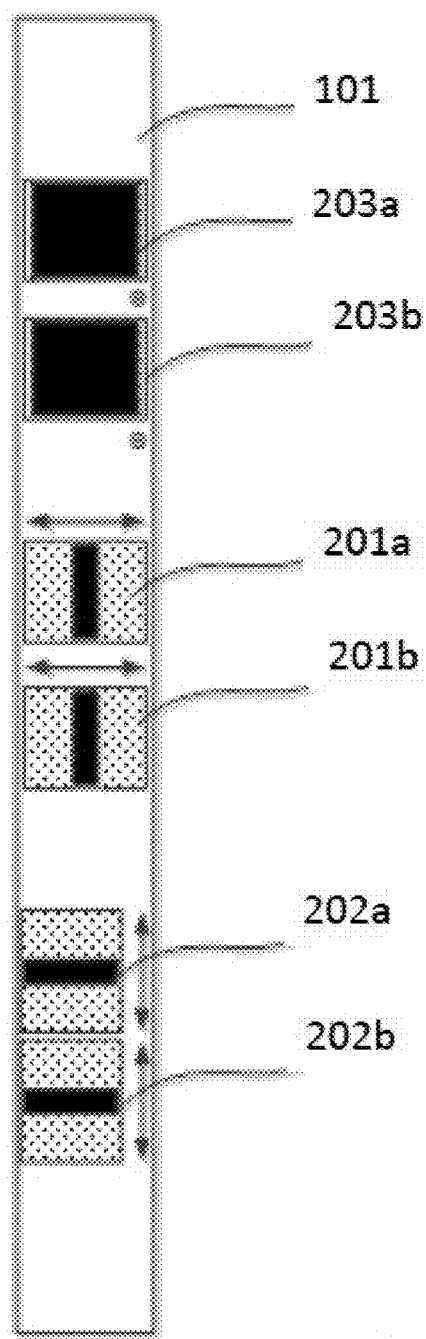
FIG. 2 is a schematic view of an interior of the mobile device shown in FIG. 1 from one side thereof.
Figure 2:
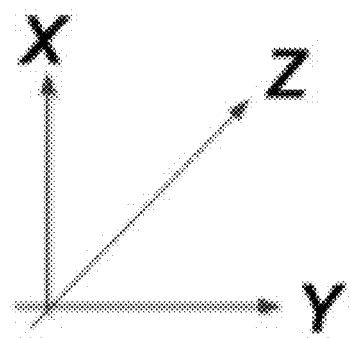
Figure 3:
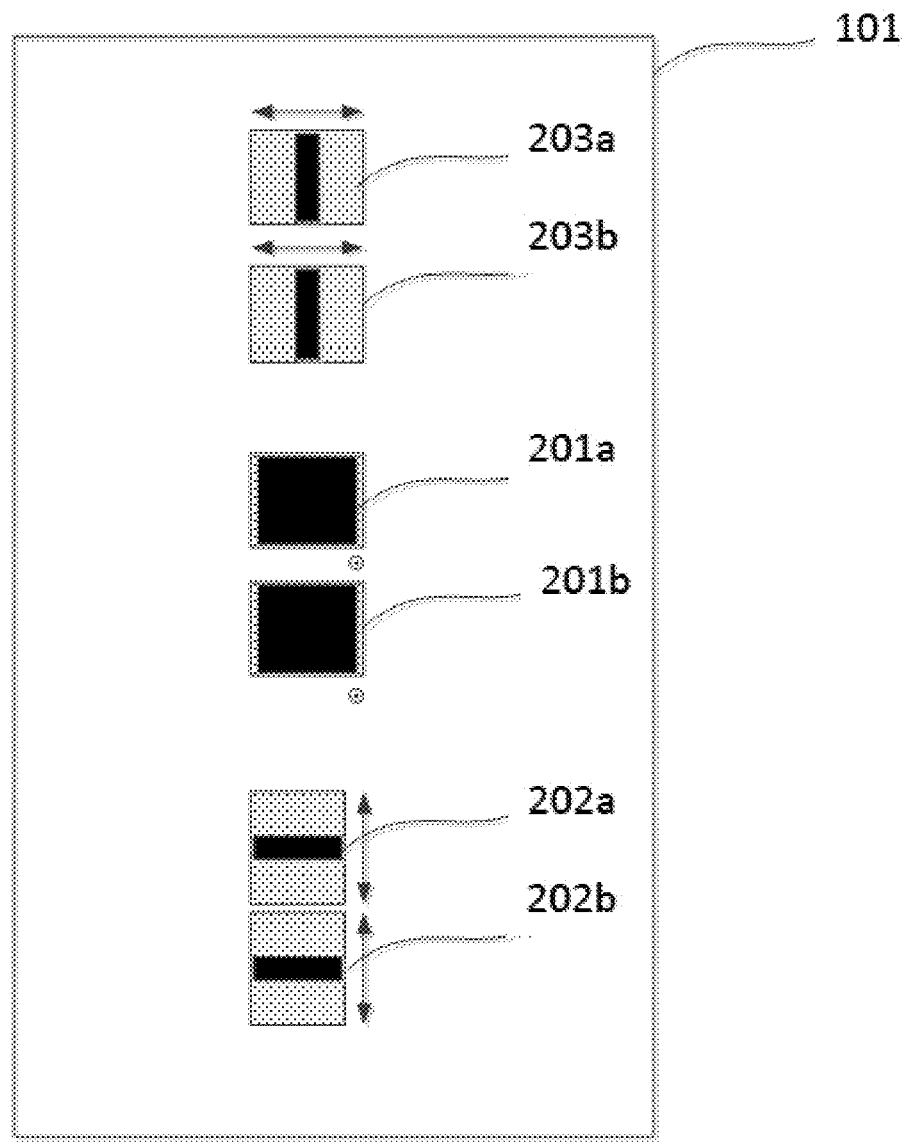
FIG. 3 is a schematic view of the interior of the mobile device shown in FIGS. 1 and 2 from the rear thereof.

FIGS. 2 and 3 are two schematic views of the interior of the mobile device 101 shown in FIG. 1, seen respectively from one side and from the rear of the mobile device 101. As may be seen in both FIGS. 2 and 3, the mobile device 101 contains three pairs or couples of linear resonating actuators (LRAs) comprising a first pair 201a, 201b, a second pair 202a, 202b and a third pair 203a, 203b. Each LRA contains a massive body, shown as black in the drawings, contained within a space of the LRA, shown as stippled in the drawings. The massive body can be driven to oscillate back and forth. The first pair of LRAs 201a, 201b can be driven to oscillate back and forth in the direction of the Y axis indicated in FIG. 2, the second pair of LRAs 202a, 202b can be driven to oscillate back and forth in the direction of the X axis indicated in FIG. 2, and the third pair of LRAs 203a, 203b can be driven to oscillate back and forth into and out of the plane of the page in the direction of the Z axis indicated in FIG. 2. The mobile device 101 also contains a driver 303 for the three respective pairs of LRAs and a calculating means 302, such as a central and/or auxiliary processor, as shown in FIGS.

Figure 4:
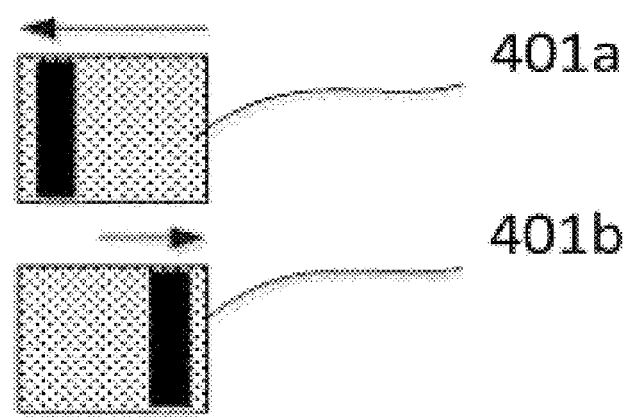
FIG. 4 schematically represents a stroke and recovery cycle of a pair of linear resonating actuators (LRAs)

FIG. 4 schematically shows a pair of LRAs 401a, 401b, such as those in the mobile device 101 shown in FIGS. 1 to 3. A stroke and recovery phase of the pair of LRAs 401a, 401b are respectively schematically represented by the long and short arrows in FIG. 4. The pair of LRAs 401a, 401b are driven to oscillate in antiphase with each other. Thus whilst a first one 401a of the pair of LRAs strokes to the left as shown in the top of FIG. 4, a second one 401b of the pair of LRAs recovers to the right as shown in the bottom of FIG. 4. The first LRA 401a then recovers to the right as the second LRA 401b strokes to the left, and the cycle of stroke and recovery for each one of the pair of LRAs 401a, 401b repeats in the same fashion thereafter.

Figure 5:
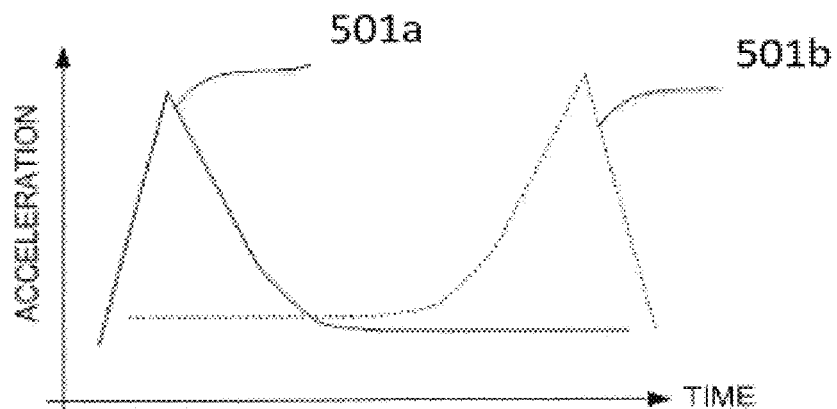
FIG. 5 is a graph showing an example of acceleration and deceleration curves of a pair of LRAs.

FIG. 5 shows an example of acceleration and deceleration curves of a pair of LRAs such as those shown in FIG. 4. Curve 501a represents a single stroke and recovery cycle of the first one 401a of the pair of LRAs and curve 501b represents a single stroke and recovery cycle of the second one 401b of the pair of LRAs. In FIG. 5, curves 501a and 501b have both been shifted vertically from the x-axis for improved ease of viewing. As can be seen from FIG. 5, the curve 501a is in antiphase with the curve 501b, so that the first one 401a of the LRAs is accelerating in a stroke whilst the second one 401b of the LRAs is in its recovery phase and vice versa. The recovery phase of each LRA is more gentle than the respective stroke, so that each stroke and recovery cycle generates a net force in the direction of the stroke. The shapes of curves 501a and 501b shown in FIG. 5 are exemplary only, and any other shape which preserves the same relationship between the stroke and the recovery phase of the stroke and recovery cycle as just described is possible.

Figure 6:
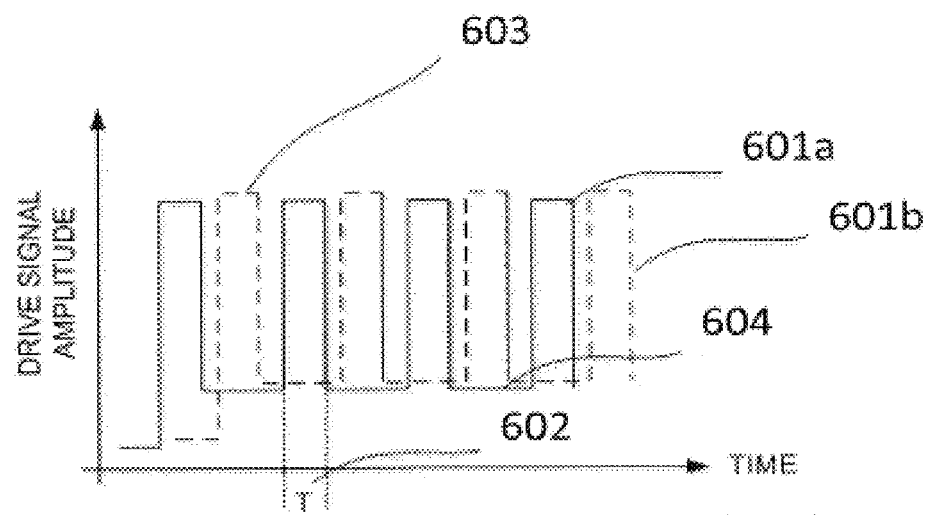
FIG. 6 is a graph showing an example of drive signals which can be used to drive a pair of LRAs.

FIG. 6 shows an example of drive signals which can be used to drive the pair of LRAs. 601a indicates the drive signal for the first one 401a of the pair of LRAs and 601b indicates the drive signal for the second one 401b of the pair of LRAs. In FIG. 6, drive signals 601a and 601b have both been shifted vertically from the x-axis for improved ease of viewing. 603 represents a portion of the drive signal 601a during which the first one of the LRAs is driven to perform a stroke and 604 represents a portion of the drive signal 601a during which the first one of the LRAs is driven to recover to its starting position. Reference numeral 602 represents a period of time, T, during which the first one 401a of the LRAs is driven to perform a stroke. As can be seen from FIG. 6, the drive signal 601b for the second one 401b of the pair of LRAs has a similar waveform to the drive signal 601a, but is offset in time relative thereto, so that the drive signal 601a for the first one 401a of the LRAs is in antiphase with the drive signal 601b for the second one 401b of the LRAs. The shapes of the drive signals 601a and 601b shown in FIG. 6 are exemplary only, and may be varied to generate different haptic effects.

Figure 7:
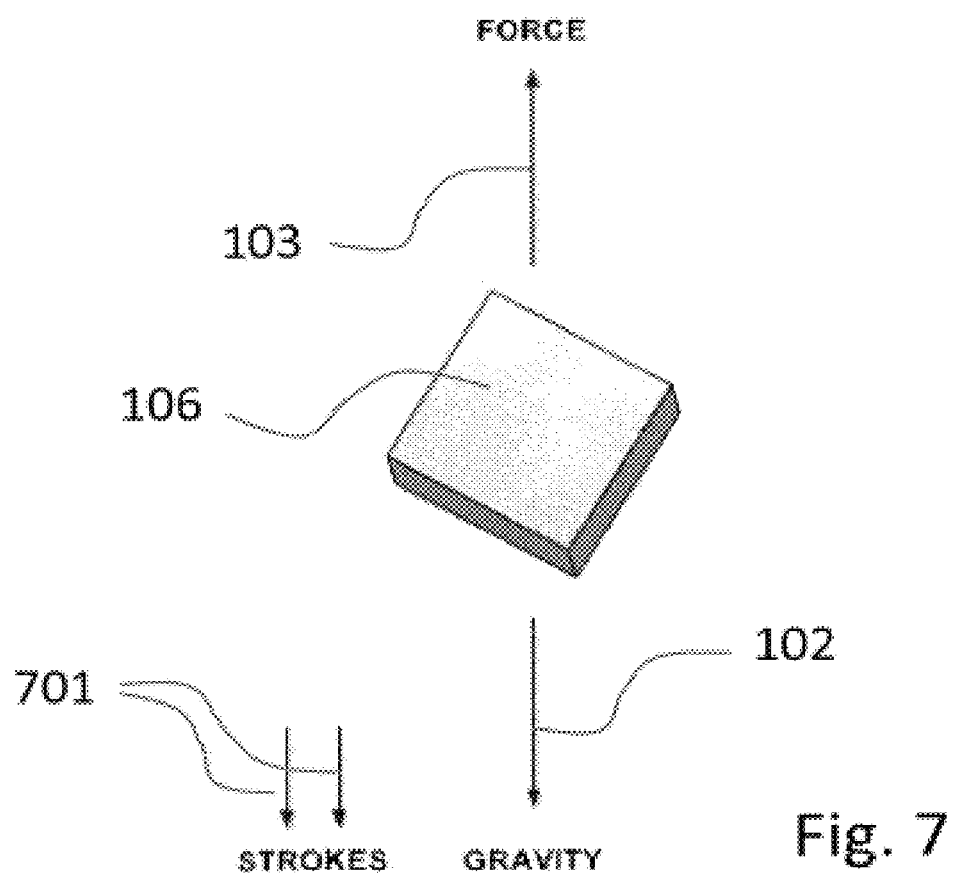
FIG. 7 is a schematic diagram showing an example of how strokes from a pair of LRAs can be used to simulate the weight of a virtual object displayed on a screen of a mobile device such as that shown in FIGS. 1 to 3.
Figure 8:
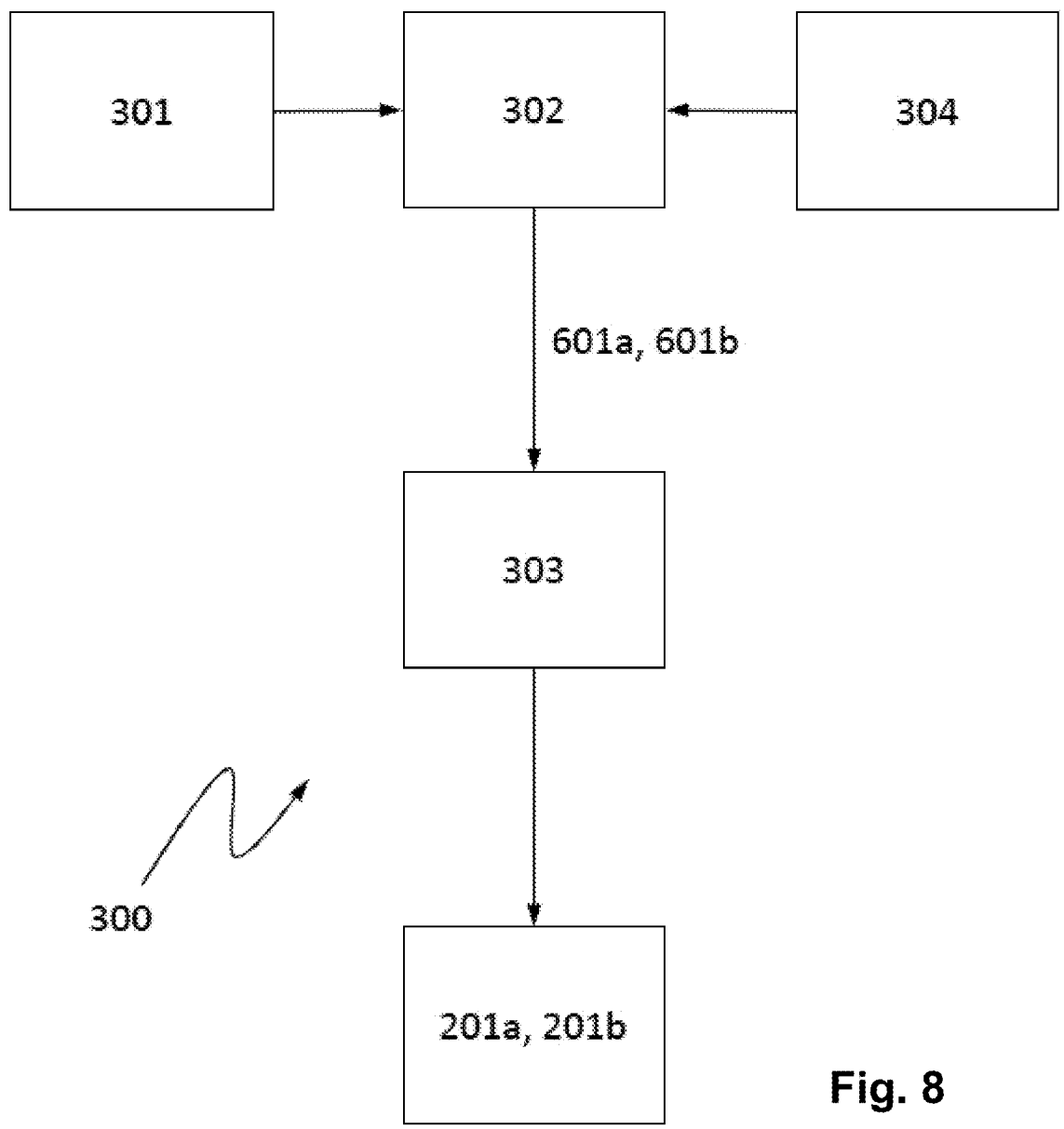
FIG. 8 is a schematic block diagram of an embodiment of a system for simulating a reaction force.

FIG. 7 shows an illustrative example of how the weight of the virtual object 106 displayed on the touch screen 107 of a mobile device such as that 101 shown in FIGS. 1 to 3 can be simulated by strokes from a pair of LRAs. A user of the mobile device 101 applies an input force to the touch screen in a direction indicated by the arrow 103. The system 300 determines the orientation of the mobile device 101 from a gravity detector 304 thereof (as shown in FIG. 8) and thus a direction in which the force of gravity would be felt to act on the virtual object 106, as represented in FIG. 7 by the arrow 102. The system 300 therefore applies strokes in the direction of the arrows 701 to give a resultant force parallel to the direction of gravity 102, in order to simulate the weight of the virtual object 106 to the user.

Whereas the specific embodiments described above in relation to FIGS. 1 to 8 have been described in relation to the simulation of the weight due to gravity of a massive object displayed on a touch screen, the system of the invention can also be used to simulate other reaction forces, including one or more of a reaction force due to inertia of a massive object, a frictional force acting on the virtual object, a reaction force due to interaction of the virtual object with another object in the same virtual environment, such as displayed on the same touch screen, a buoyancy force due to immersion of the displayed object in a fluid medium in the same virtual environment, and a force due to elastic resilience or one or more other mechanical properties of the virtual object.

The present invention provides a system for simulating a reaction force from a virtual object. The system 300 at least comprises an input force sensor 301, calculating means 302 connected to the input force sensor, at least a first pair 201a, 201b of linear resonant actuators (LRAs) and a driver 303 for the LRAs connected to the calculating means 302. The input force sensor 301 is to sense an input force applied to the virtual object by a user. The calculating means 302 is to receive the input force from the input force sensor 301 and to calculate the reaction force to apply to the user. The pair of LRAs 201a, 201b are constrained to move along a first axis Y. The driver 303 is to receive from the calculating means 302 drive signals to alternately drive each one of the pair of LRAs 201a, 201b in a first direction along the first axis by an amount determined by the reaction force, whilst allowing the other one of the pair of LRAs to recover more gently in a direction opposite to the first direction. The invention also provides a corresponding method of simulating a reaction force from a virtual object and a mobile device 101 at least comprising such a system.

| Reference Numerals: | |
| --- | --- |
| 101 | Mobile device |
| 102 | Direction of force of gravity |
| 103 | Direction of input force applied by user |
| 104 | Fingers of user |
| 105 | Thumb of user |
| 106 | Virtual object |
| 107 | Touch screen |
| 201a, 201b | First pair of LRAs |
| 202a, 202b | Second pair of LRAs |
| 203a, 203b | Third pair of LRAs |
| 300 | System for simulating a reaction force |
| 301 | Input force sensor |
| 302 | Calculating means |
| 303 | Driver |
| 304 | Gravity detector |
| 401a | First one of a pair of LRAs |
| 401b | Second one of a pair of LRAs |
| 501a | Stroke and recovery cycle of a first one of a pair of LRAs |
| 501b | Stroke and recovery cycle of a second one of a pair of LRAs |
| 601a | Drive signal for a first one of a pair of LRAs |
| 601b | Drive signal for a second one of a pair of LRAs |
| 602 | Time period for stroke |
| 603 | Stroke portion of drive signal |
| 604 | Recovery portion of drive signal |
| 701 | Direction of strokes |

The invention claimed is:

1. A system (300) for simulating a reaction force (701) from a virtual object (106), the system at least comprising:
   an input force sensor (301) to sense an input force (103) applied to the virtual object by a user;
   calculating means (302) connected to the input force sensor (301) to receive the input force therefrom and to calculate the reaction force to apply to the user;
   at least a first pair (201a, 201b) of linear resonant actuators (LRAs) constrained to move along a first axis (Y); and
   a driver (303) for the LRAs connected to the calculating means (302) to receive therefrom drive signals (601a, 601b);
   wherein the driver (303) is configured to alternately drive each one of the pair of LRAs in a first direction along the first axis by an amount determined by the reaction force, whilst allowing the other one of the pair of LRAs to recover more gently in a direction opposite to the first direction;
   the system (300) further comprising a gravity detector (304) to detect a local direction of gravity, the gravity detector being connected to the calculating means (302) to supply the local direction of gravity to the calculating means for the calculating means to calculate a weight of the virtual object to simulate as at least a part of the reaction force.

2. A system according to claim 1, wherein the input force sensor (301) comprises a touch-sensitive screen (107) for displaying the virtual object.

3. A system according to claim 1, further comprising at least a second pair of LRAs (202a, 202b) constrained to move along a second axis (X) crossing the first axis (Y).

4. A system according to claim 3, further comprising at least a third pair of LRAs (203a, 203b) constrained to move along a third axis (Z) lying outside a plane defined by the first and second axes.

5. A system according to claim 4, wherein the first, second and third axes (X, Y, Z) are orthogonal to each other.

6. A system according to claim 1, comprising more than two LRAs per axis (X, Y, Z).

7. A system according to claim 1, wherein the LRAs each have a resonant frequency above 100 Hz.

8. A mobile device (101) comprising at least a system according to claim 1.

9. A method of simulating a reaction force from a virtual object, the method at least comprising:
   sensing an input force applied to the virtual object by a user;
   calculating the reaction force to apply to the user;
   detecting a local direction of gravity and calculating a weight of the virtual object to simulate as at least a part of the reaction force; and
   applying the reaction force to the user using at least a first pair (201a, 201b) of linear resonant actuators (LRAs);
   wherein the reaction force is applied to the user by constraining the pair of LRAs to move along a first axis (Y); and
   alternately driving each one of the pair of LRAs in a first direction along the first axis by an amount determined by the reaction force, whilst allowing the other one of the pair of LRAs to recover more gently in a direction opposite to the first direction.

10. A method according to claim 9, wherein the virtual object is displayed on a touch-sensitive screen (107) and the input force applied to the virtual object by the user is sensed by the touch-sensitive screen.

11. A method according to claim 9, wherein the reaction force is applied to the user using at least a second pair of LRAs (202a, 202b) by constraining the second pair of LRAs to move along a second axis (X) crossing the first axis (Y) and alternately driving each one of the second pair of LRAs in a second direction along the second axis by an amount determined by the reaction force, whilst allowing the other one of the second pair of LRAs to recover more gently in a direction opposite to the second direction.

12. A method according to claim 9, wherein the reaction force is applied to the user using at least a third pair of LRAs (203a, 203b) by constraining the third pair of LRAs to move along a third axis (Z) lying outside a plane defined by the first and second axes (X, Y) and alternately driving each one of the third pair of LRAs in a third direction along the third axis by an amount determined by the reaction force, whilst allowing the other one of the third pair of LRAs to recover more gently in a direction opposite to the third direction.

13. A method according to claim 9, wherein each one of the pair of LRAs is alternately driven at a frequency of more than 100 Hz.

* * * * *